UNITED STATES PATENT OFFICE.

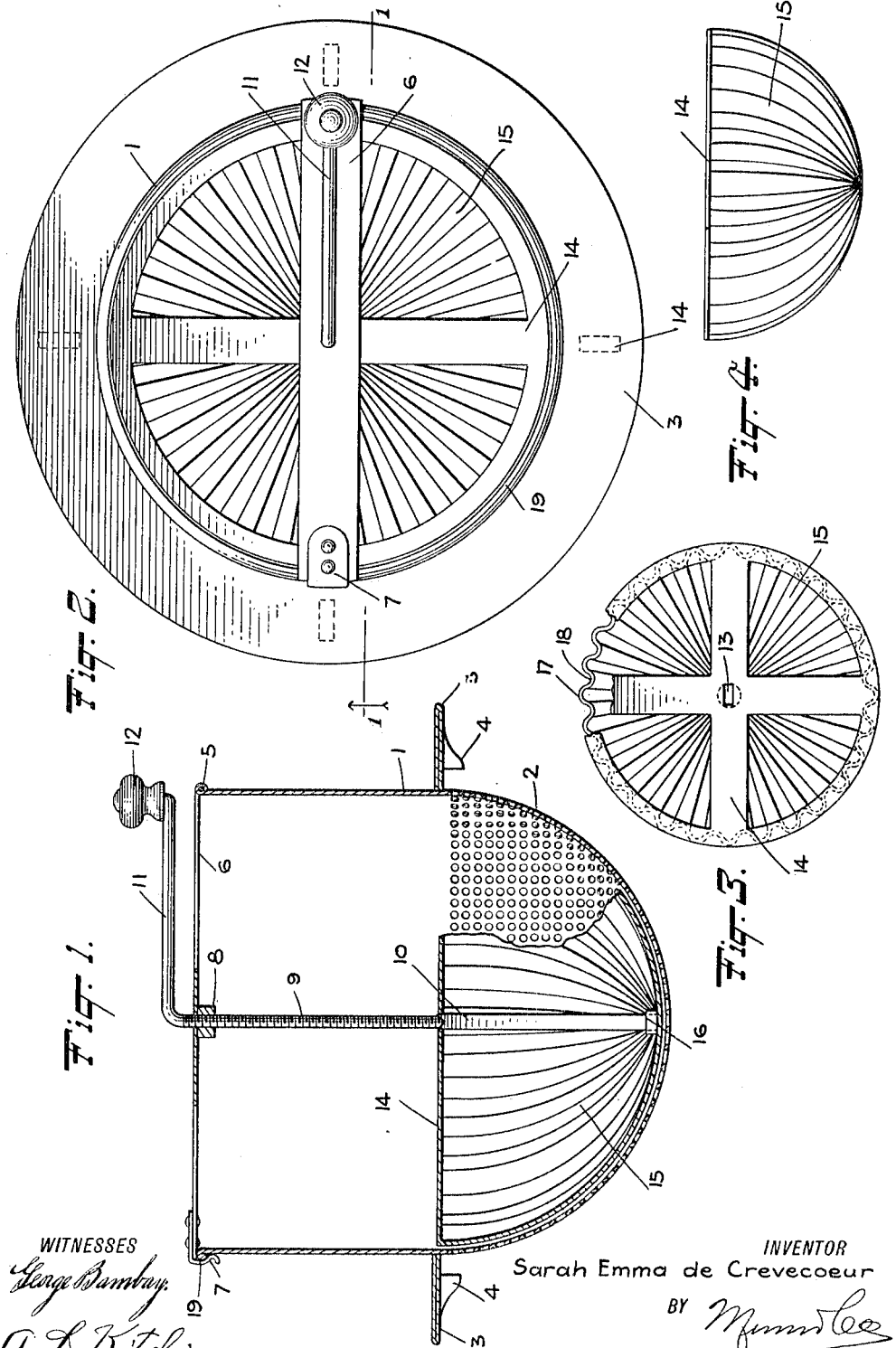

SARAH EMMA DE CREVECOEUR, OF COLTON, CALIFORNIA.

COLANDER.

1,105,409.　　Specification of Letters Patent.　Patented July 28, 1914.

Application filed May 23, 1912. Serial No. 699,209.

*To all whom it may concern:*

Be it known that I, SARAH EMMA DE CREVECOEUR, a citizen of the United States, and a resident of Colton, in the county of San Bernardino and State of California, have invented a new and Improved Colander, of which the following is a full, clear, and exact description.

This invention relates to improvements in culinary utensils, and particularly to what are known as colanders, and has for an object to provide an improved structure which is designed to move fruit or other material transversely of a perforated straining member through which it is gradually forced so as to more easily and uniformly distribute the straining.

A further object of the invention is to provide an improved colander device through which fruit or other material may be forced or strained, the same being formed with a perforated portion and a rotatable corrugated member formed with means for causing the same to gradually approach the perforated portion so that a gradual pressure is exerted on the material to force the same through the perforated member and at the same time a substantial stirring action is provided so that the finer portions only are forced through.

In carrying out the objects of the invention, a perforated receptacle is provided in which is arranged a rotatable and reciprocating pressure member formed corrugated. This member is provided with a suitable rotating handle which when operated causes the pressure member to approach the perforated receptacle and cause a rotation thereof at the same time, whereby a rubbing action is given to the fruit or other material being operated upon at the same time that the gradual approach is exerted for forcing the same through the perforations in the receptacle. In this way the action of a person's hand is simulated or imitated, and thus the best possible results are obtained with the maximum speed and efficiency.

A practical embodiment of the invention is represented in the accompanying drawings forming a part of this specification, in which similar characters of reference indicate corresponding parts in all the views.

Figure 1 is a longitudinal vertical section through an embodiment of the invention, the same being taken approximately on the line 1—1 of Fig. 2; Fig. 2 is a top plan view of an embodiment of the invention; Fig. 3 is a top plan view of the pressure member and Fig. 4 is an edge view of the pressure member shown in Fig. 3.

Referring to the accompanying drawings by numerals, 1 indicates a receptacle having a perforated bottom 2. Connected in any desired manner with the receptacle 1 is an annular flange 3 preferably provided with bracing stops 4. This permits the receptacle 1 to be placed on another receptacle so that when matter is forced through the perforations in the bottom 2 the same will be properly taken care of. Hinged to the upper edge of the receptacle 1 at 5 is a cross bar 6 held in place by a suitable catch 7. Whenever desired the cross bar 6 may be removed by removing the pintle of hinge 5, and then bodily remove the cross bar. The cross bar 6 is provided with a nut 8 arranged centrally thereof which accommodates a threaded shaft 9 having a flattened portion 10 and a turned over portion 11 which forms a crank on which a knob 12 is mounted designed to be manually grasped for rotating the shaft 9 and associated parts.

The flattened portion 10 of the shaft 9 extends through a rectangular opening 13 in the cross bar 14 rigidly secured to the top of the pressure member 15. The flattened portion 10 of the bar 9 extends downwardly and is fitted into a rectangular seat 16, whereby when the shaft 9 is rotated the pressure member 15 will be rotated and by reason of the fact that the nut 8 is rigidly secured to the cross bar 6, the pressure member 15 will not only rotate but will gradually move downward until the same engages the bottom 2. In order to cause a rubbing action the pressure member 15 is formed with corrugations 17 (Fig. 3) which of course grip against the material being acted upon and press the same through the apertures in the bottom 2. By having these corrugations taper from the upper edge of the pressure member 15 to the seat 16, the member being acted upon will be alternately compressed and relieved by the corrugations 17, and the intermediate valleys or reduced portions 18.

In operation when it is desired to use the device, the shaft 9 is rotated until the cross bars 14 are arranged at any desired height and then the catch 7 is released so that the pressure member 15 may be swung out of the receptacle 1. The material to be operated upon is then placed in the receptacle 1 and the pressure member 15 moved back to the position in the receptacle with the catch 7 engaging the bead 19, as shown in Fig. 1. A rotation of the shaft 9 will cause the proper kneading and mixing action of the material as well as a downward pressure so that the material is mixed and simultaneously pressed for forcing either all or part of the same through the apertures in the bottom 2. If it is found desirable a catch similar to catch 7 could be substituted for the hinge 5.

Having thus described my invention I claim as new and desire to secure by Letters Patent:—

1. In a device of the character described, a receptacle, a presser member arranged in said receptacle formed with a squared aperture near the top and a socket member at the bottom, a shaft threaded at its upper end and formed square in cross section at its lower end for fitting into said socket and said squared aperture, a nut fitting over the threaded portion of said shaft, means for holding said nut stationary in respect to said shaft, and a handle connected with said shaft for rotating the same whereby when said shaft is rotated the same will rotate said presser member and move the same toward and from the bottom of said receptacle according to the direction of rotation of the shaft.

2. In a device of the character described, a receptacle, a presser member arranged in said receptacle formed with a squared aperture near the top and a socket member near the bottom, a shaft threaded at the upper part and squared at the lower part, removably fitting into said squared aperture and said socket, a threaded member fitted over the threaded portion of said shaft, and a removable support for said threaded member.

In testimony whereof I have signed my name to this specification in the presence of two subscribing witnesses.

SARAH EMMA DE CREVECOEUR.

Witnesses:
  CHAS. F. WARD,
  Mrs. W. C. GERMAN.

Copies of this patent may be obtained for five cents each, by addressing the "Commissioner of Patents, Washington, D. C."